United States Patent
Sivaramakrishnan et al.

(10) Patent No.: US 10,120,800 B2
(45) Date of Patent: Nov. 6, 2018

(54) HISTORY BASED MEMORY SPECULATION FOR PARTITIONED CACHE MEMORIES

(71) Applicant: Oracle International Corporation, Redwood City, CA (US)

(72) Inventors: Ramaswamy Sivaramakrishnan, San Jose, CA (US); Serena Leung, South San Francisco, CA (US); David Smentek, Cupertino, CA (US)

(73) Assignee: Oracle International Corporation, Redwood Shores, CA (US)

(*) Notice: Subject to any disclaimer, the term of this patent is extended or adjusted under 35 U.S.C. 154(b) by 342 days.

(21) Appl. No.: 14/584,755

(22) Filed: Dec. 29, 2014

(65) Prior Publication Data

US 2016/0019149 A1    Jan. 21, 2016

Related U.S. Application Data

(60) Provisional application No. 62/026,372, filed on Jul. 18, 2014.

(51) Int. Cl.
G06F 12/00      (2006.01)
G06F 12/0811    (2016.01)
G06F 12/0862    (2016.01)

(52) U.S. Cl.
CPC ...... *G06F 12/0811* (2013.01); *G06F 12/0862* (2013.01); *G06F 2212/1024* (2013.01); *G06F 2212/6024* (2013.01); *Y02D 10/13* (2018.01)

(58) Field of Classification Search
CPC .............. G06F 12/0862; G06F 12/0811; G06F 2212/1024; G06F 2212/6024
See application file for complete search history.

(56) References Cited

U.S. PATENT DOCUMENTS

| | | | |
|---|---|---|---|
| 5,732,253 A | 3/1998 | McMahan | |
| 6,209,064 B1 | 3/2001 | Weber | |
| 6,629,210 B1* | 9/2003 | Arimilli | G06F 12/0815 711/123 |
| 6,973,547 B2* | 12/2005 | Nilsson | G06F 12/0817 711/137 |
| 7,234,029 B2 | 6/2007 | Khare | |
| 7,546,422 B2 | 6/2009 | George | |
| 2002/0161976 A1* | 10/2002 | Ito | G06F 12/0855 711/128 |
| 2009/0265293 A1* | 10/2009 | Nicholas | G06F 12/0862 706/45 |

\* cited by examiner

*Primary Examiner* — Kalpit Parikh
(74) *Attorney, Agent, or Firm* — Meyertons, Hood, Kivlin, Kowert & Goetzel, P.C.

(57) ABSTRACT

A cache memory that selectively enables and disables speculative reads from system memory is disclosed. The cache memory may include a plurality of partitions, and a plurality of registers. Each register may be configured to stored data indicative of a source of returned data for previous requests directed to a corresponding partition. Circuitry may be configured to receive a request for data to a given partition. The circuitry may be further configured to read contents of a register corresponding to the given partition, and initiate a speculative read dependent upon the contents of the register.

13 Claims, 7 Drawing Sheets

HISTORY BASED MEMORY SPECULATION FOR PARTITIONED CACHE MEMORIES

PRIORITY CLAIM

The present application claims benefit of priority to provisional application No. 62/026,372 titled "HISTORY BASED MEMORY SPECULATION FOR PARTITIONED LAST LEVEL CACHE MEMORIES" and filed on Jul. 18, 2014 which is incorporated by reference in its entirety as though fully and completely set forth herein.

BACKGROUND

Technical Field

This invention relates to integrated circuits, and more particularly, to techniques for operating cache memories within processors and processor cores.

Description of the Related Art

Computing systems typically include one or more processors or processor cores which are configured to execute program instructions. The program instructions may be stored in one of various locations within a computing system, such as, e.g., main memory, a hard drive, a CD-ROM, and the like. In some cases, a hierarchy of local memories or cache memories may be employed to store frequently accessed program instructions and data.

In particular, most processor cores will have at least a level one (L1) cache that is proximal to the core. In many cases, and especially in multi-core designs, a processor will also have a level two (L2) cache, and in some cases a level three (L3) cache. The L2 and L3 caches are in many cases shared among the various processor cores. The multiple cache hierarchies allow a processing system to keep copies of data that is accessed frequently in the local faster cache memory hierarchy, rather than having to access main memory, which is typically slower.

When a processor requests data or a program instruction that is not contained within a cache memory, a further request may be made to main memory for desired information. The processor may also request that the information be stored in the cache memory so that the information may subsequently be retrieved from the cache memory as opposed to main memory. Storing new information in a cache memory may be dependent upon available space within the cache memory. In cases where the cache memory is already storing its maximum number of cache lines, a line may need to be selected for removal (commonly referred to as "eviction") from the cache memory. Once a previously stored cache line has been selected and evicted from the cache memory, a new cache line may be stored.

SUMMARY

Various embodiments of an apparatus and method for operating a cache memory are disclosed. Broadly speaking, a method and an apparatus are contemplated that include a memory that includes a plurality of partitions and at least one register. The at least one register may be configured to store history data, which may include information indicative of a source of returned data for at least one previous read request. Circuitry may be configured to receive a read request for data from a first partition. The history data may be read responsive to a determination that the data is not stored in the first partition. A speculative read of the data from a second memory may then be initiated dependent upon the history data.

In a non-limiting embodiment, the circuitry may be further configured to a number of previous requests whose source of returned data is a given partition may be determined. The circuitry may be further configured to the initiate the speculative read in response to a determination that the number of previous requests whose source of returned data source is a given partition is less than a predetermined threshold value.

In one implementation, the history data includes a plurality of portions. Each portion of the plurality of portions may correspond to a respective execution thread of a plurality of execution threads.

In another non-limiting embodiment, the circuitry may be further configured to update the history data. The update may be in response to a determination that the data is not stored in the first partition.

Figure 1:
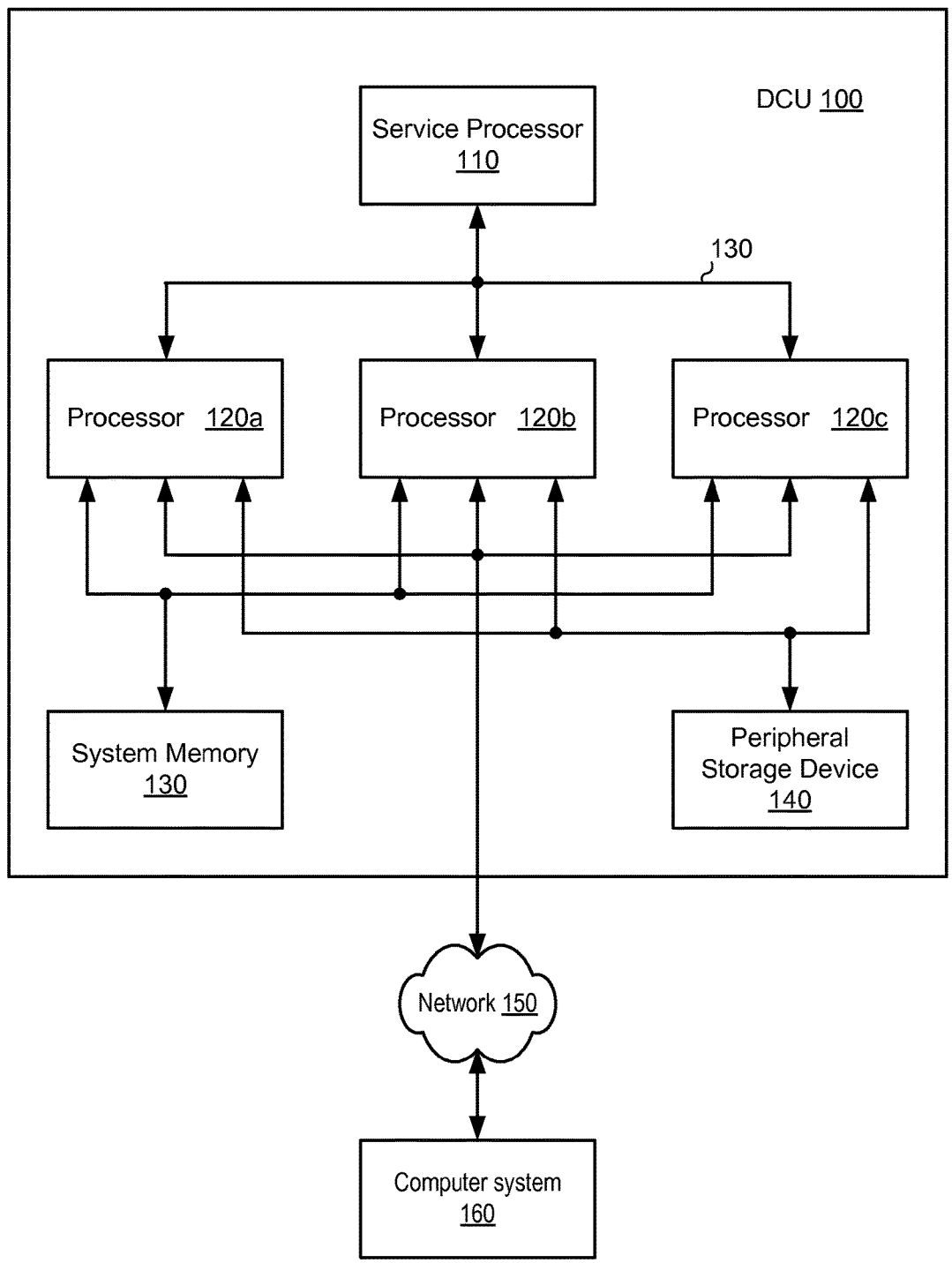
FIG. 1 is a block diagram of an embodiment of a distributed computing unit.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f), interpretation for that unit/circuit/component.

DETAILED DESCRIPTION OF EMBODIMENTS

To improve computational performance, a system-on-a-chip (SoC) may include multiple processors or processor cores. Each processor may employ a local cache memory to provide rapid access to local copies of instructions and operands. In some cases, a hierarchy of cache memories may be employed, and cache memories in the highest level of the hierarchy, such as, e.g., an L3 cache, may be shared between multiple processors or processor cores. To manage the various requests to a shared cache memory, the shared cache memory may be organized into multiple partitions, with each processor or processor core coupled to a respective partition of the cache memory.

Partitioned cache memories, as described above, may provide low latency when requested data is located within a given partition (commonly referred to as a "cache hit"). In general, when a request for data is made, the data may be located in a partition of the cache memory, or in main memory. When the requested data is not located within a given cache partitions (commonly referred to as a "cache miss"), a speculative read to main memory may be issued in parallel with a search of the other partitions within the cache. As used and described herein, a speculative read to main memory is a read to main memory where the resultant data may be superseded by data returned from another source, such as, another cache partition, for example. As main memory access may have a high latency, speculative reads may be used to reduce latency, which may increase system performance. In cases, when no partition of the cache has a copy of the requested data, the data returned from the speculative read are used. In some cases, however, for certain shared workloads, the request data is often found in another partition of the cache, and the data returned from the speculative read is discarded. The repeated discard of speculative read data may result in high consumption of available memory bandwidth and excess power consumption. The embodiments illustrated in the drawings and described herein may provide techniques for preserving memory bandwidth, reducing power, while still providing the latency benefit of employing speculative reads.

Computing System Overview

A block diagram illustrating one embodiment of a distributed computing unit (DCU) 100 is shown in FIG. 1. In the illustrated embodiment, DCU 100 includes a service processor 110, coupled to a plurality of processors 120a-c through scalable system interface (SSI) 130. Processors 120a-c are in turn coupled to system memory 130, and peripheral storage device 140. DCU 100 is coupled to a network 150 which is in turn coupled to a computer system 160. In various embodiments, DCU 100 may be configured as a rack-mountable server system, a standalone system, or in any suitable form factor. In some embodiments, DCU 100 may be configured as a client system rather than a server system.

System memory 130 may include any suitable type of memory, such as Fully Buffered Dual Inline Memory Module (FB-DIMM), Double Data Rate or Double Data Rate 2 Synchronous Dynamic Random Access Memory (DDR/DDR2 SDRAM), or Rambus® DRAM (RDRAM®), for example. It is noted that although one system memory is shown, in various embodiments, any suitable number of system memories may be employed.

Peripheral storage device 140 may, in some embodiments, include magnetic, optical, or solid-state storage media such as hard drives, optical disks, non-volatile random-access memory devices, etc. In other embodiments, peripheral storage device 140 may include more complex storage devices such as disk arrays or storage area networks (SANs), which may be coupled to processors 120a-c via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processors 120a-c, such as multi-media devices, graphics/display devices, standard input/output devices, etc.

In one embodiment, service processor 110 may include a field programmable gate array (FPGA) or an application specific integrated circuit (ASIC) configured to coordinate initialization and boot of processors 120a-c, such as from a power-on reset state. Additionally, in some embodiments, service processor 110 may include a programmable read-only memory (PROM) that may store instructions to perform a power-on self-test (POST). In various embodiments, service processor 110 may be configured to allow access to administrative functions such as test and debug modes of processors 120a-c, such as testing cache memories in processors 120a-c, or providing test code to processors 120a-c such that each of processors 120a-c may test their respective cache memories, for example.

As described in greater detail below, each of processors 120a-c may include one or more processor cores and cache memories. In some embodiments, each of processors 120a-c may be coupled to a corresponding system memory, while in other embodiments, processors 120a-c may share a common system memory. Processors 120a-c may be configured to work concurrently on a single computing task and may communicate with each other through SSI bus 130 to coordinate processing on that task. For example, a computing task may be divided into three parts and each part may be assigned to one of processors 120a-c. Alternatively, processors 120a-c may be configured to concurrently perform independent tasks that require little or no coordination among processors 120a-c.

The embodiment of the distributed computing system illustrated in FIG. 1 is one of several examples. In other embodiments, different numbers and configurations of components are possible and contemplated. It is noted that although FIG. 1 depicts a multi-processor system, the embodiments described herein may be employed with any number of processors, including a single processor core.

Processor Overview

Figure 2:
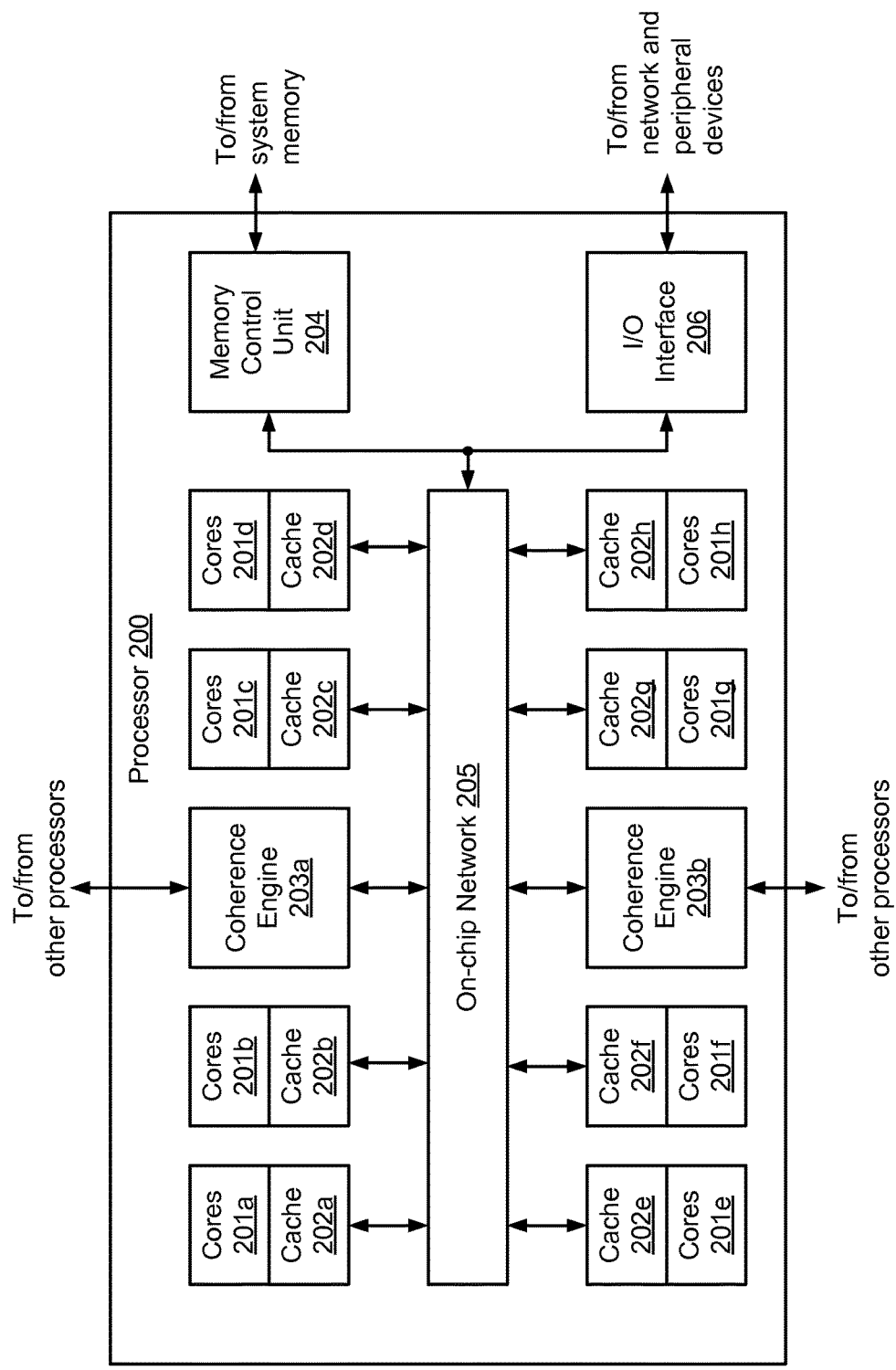
FIG. 2 is a block diagram of an embodiment of a processor.

A block diagram illustrating one embodiment of a processor 200 is shown in FIG. 2. In some embodiments, processor 200 may correspond to processors 120a-c of DCU 100 in FIG. 1. In the illustrated embodiment, processor 200 includes a plurality of processor core groups 201a-h. each including one or more processor cores. It is noted that although 8 core groups are shown, in various embodiments, any suitable number of processor cores may be employed. Each of core groups 201-ah is coupled to a respective one of cache memory partitions 202a-h. Collectively, cache memory partitions 202a-h form a cache memory for the core groups 201a-h. Each or cache memory partitions 202a-h is coupled to on-chip network 205, which is, in turn coupled to memory control unit 204. In various embodiments, memory control unit 204 is coupled to one or more banks of system memory, also referred to herein as main memory (not shown). Processor 200 further includes coherence engines 203a-b which are also coupled to on-chip network 205. as well as to other processors. In some embodiments, the elements included in processor 200 may be fabricated as part of a single integrated circuit (IC), for example on a single semiconductor die.

Each or core groups 201a-h may include one or more processor cores, and be configured to execute instructions and to process data according to a particular instruction set architecture (ISA). In one embodiment, core groups 201*a-h* may be configured to implement the SPARC® V9 ISA, although in other embodiments it is contemplated that any desired ISA may be employed, such as x86, PowerPC® or MIPS®, for example. In the illustrated embodiment, each of core groups 201*a-h* may be configured to operate independently of the others, such that all core groups 201*a-h* may execute in parallel. Additionally, in some embodiments each of core groups 201*a-h* may be configured to execute multiple threads concurrently on a separate processor core, where a given thread may include a set of instructions that may execute independently of instructions from another thread. (For example, an individual software process, such as an application, may consist of one or more threads that may be scheduled for execution by an operating system.) In one embodiment, each of core groups 201*a-h* may be configured to concurrently execute instructions from eight threads, for a total of 64 threads concurrently executing across processor 200. In other embodiments, however, it is contemplated that other numbers of core groups 201*a-h* may be provided, and that core groups 201*a-h* may concurrently process different numbers of threads.

On-chip network 205 may allow communication between cache memory partitions 202*a-h*. core groups 201*a-h*. and external resources through memory control unit 204 and I/O interface 206. In some embodiments, multiple communication protocols may be implemented within on-chip network 205. For example, on-chip network 205 may include a ring network, a point-to-point network, and a store-and-forward network. In various embodiments, different types of communications, such as, e.g., requests, may be transmitted over different networks. It is noted that although on-chip network 205 is depicted as coupling processors to memory controllers, in other embodiments, a similar type of bus may be employed to couple multiple processing cores to a hierarchy of cache memories, or other functional blocks, within a single processor.

Cache memory partitions 202*a* may, in various embodiments, collectively form a level 3 (L3) cache memory for processor 200. By using separate cache memory partitions, individual processor core group, such as, e.g., core group 201*a* may be high-speed access to data stored in its associated cache memory partition, thereby reducing latency. In such a system, however, the multiple cache memory partitions need to maintain coherency with respect to each other. Cache memory partitions 202*a-h* may, in various embodiments, implement one of numerous coherency protocols, such as, e.g., MOESI, MESI, or any suitable cache coherency protocol.

Each of cache memory partitions 202*a-h* may be configured to cache instructions and data for use by core groups 201*a-h*. In the illustrated embodiment, each of cache memory partitions 202*a-h* may be separately addressable and independently accessed, may concurrently return data to a respective core groups 201*a-h*. In some embodiments, each individual cache memory partition may be implemented using set-associative or direct-mapped techniques. For example, in one embodiment, each of cache memory partitions 202*a-h* may be a 8 megabyte (MB) cache, although other cache sizes and geometries are possible and contemplated.

Each of cache memory partitions 202*a-h* may be implemented, in some embodiments, as a writeback cache in which written (dirty) data may not be written to system memory until a corresponding cache line is evicted. Cache memory partitions 202*a-h* may each be designed according to one of various design styles. For example, in some embodiments, a given cache memory partition may include Static Random Access Memory (SRAM) data storage cells, while, in other embodiments, such a partition may include dynamic, latched-based, or any other suitable type of data storage cell.

Memory control unit 204 may be configured to manage the transfer of data between cache memory partitions 202*a-h* and system memory, for example in response to fill requests and data evictions. In some embodiments, multiple instances of memory control unit 204 may be implemented, with each instance configured to control a respective bank of system memory. Memory control unit 204 may be configured to interface to any suitable type of system memory, such as described above in reference to FIG. 1 In some embodiments, memory control unit 204 may be configured to support interfacing to multiple different types of system memory.

In the illustrated embodiment, processor 200 may also be configured to receive data from sources other than system memory, such as, another processor, for example. Such data may be received using I/O interface 206, or through one of coherence engineers 203*a-b*. I/O interface 206 may be configured to provide a central interface for such sources to exchange data with core groups 201*a-h*, while coherence engineers 203*a-b* may be configured to allow the exchange of data with other processors, or those processor's cache or main memories. In some embodiments, I/O interface 206 may be configured to coordinate Direct Memory Access (DMA) transfers of data between external peripherals and system memory via coherence engines 203*a-b* and memory control unit 204. In one embodiment, I/O interface 206 may be configured to couple processor 200 to external boot and/or service devices. For example, initialization and startup of processor 200 may be controlled by an external device (such as, e.g., a FPGA) that may be configured to provide an implementation- or system-specific sequence of boot instructions and data. Such a boot sequence may, for example, coordinate reset testing, initialization of peripheral devices and initial execution of processor 200, before the boot process proceeds to load data from a disk or network device. Additionally, in some embodiments such an external device may be configured to place processor 200 in a debug, diagnostic, or other type of service mode upon request.

I/O interface 206 may be configured to coordinate data transfer between processor 200 and one or more peripheral devices. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, I/O interface 206 may implement one or more instances of an interface such as Peripheral Component Interface Express (PCI Express™), although it is contemplated that any suitable interface standard or combination of standards may be employed. For example, in some embodiments I/O interface 206 may be configured to implement a version of Universal Serial Bus (USB) protocol or IEEE 1394 (Firewire) protocol in addition to or instead of PCI Express™.

I/O interface 206 may also be configured to coordinate data transfer between processor 200 and one or more devices (e.g., other computer systems) coupled to processor 200 via a network. In one embodiment, I/O interface 206 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, I/O interface 206 may be configured to implement multiple discrete network interface ports.

Core Overview

Figure 3:
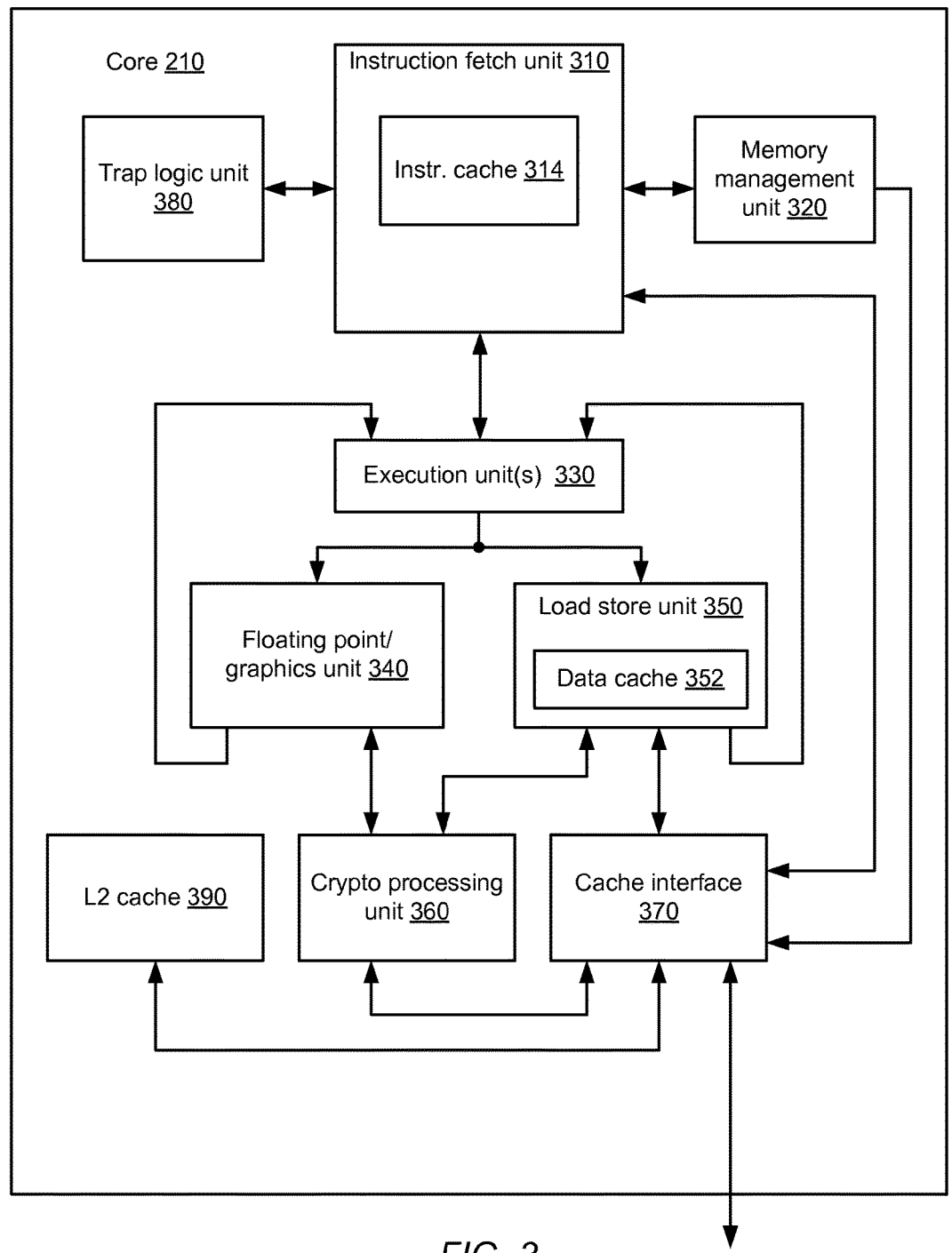
FIG. 3 is a block diagram of an embodiment of a processor core.

A possible embodiment of a processor core is illustrated in FIG. 3. In the illustrated embodiment, core 300 includes an instruction fetch unit (IFU) 310 coupled to a memory management unit (MMU) 320, a cache interface 370, a trap logic unit (TLU) 380, a L2 cache memory 390, and one or more of execution units 330. In some embodiments, core 300 may correspond to a give processor core of core groups 201a-h as illustrated in FIG. 2. Execution unit 330 is coupled to both a floating point/graphics unit (FGU) 340 and a load store unit (LSU) 350. Each of the latter units is also coupled to send data back to each of execution units 330. Both FGU 340 and LSU 350 are coupled to a crypto processing unit 360. Additionally, LSU 350, crypto processing unit 360, L2 cache memory 390 and MMU 320 are coupled to cache interface 370, which may in turn be coupled to on-chip network 206 shown in FIG. 2.

Instruction fetch unit 310 may be configured to provide instructions to the rest of core 300 for execution. In the illustrated embodiment, IFU 310 may be configured to perform various operations relating to the fetching of instructions from cache or memory, the selection of instructions from various threads for execution, and the decoding of such instructions prior to issuing the instructions to various functional units for execution. Instruction fetch unit 310 further includes an instruction cache 314. In one embodiment, IFU 310 may include logic to maintain fetch addresses (e.g., derived from program counters) corresponding to each thread being executed by core 300, and to coordinate the retrieval of instructions from instruction cache 314 according to those fetch addresses.

If core 300 is configured to execute only a single processing thread and branch prediction is disabled, fetches for the thread may be stalled when a branch is reached until the branch is resolved. Once the branch is evaluated, fetches may resume. In cases where core 300 is capable of executing more than one thread and branch prediction is disabled, a thread that encounters a branch may yield or reallocate its fetch slots to another execution thread until the branch is resolved. In such cases, an improvement in processing efficiency may be realized. In both single and multi-threaded modes of operation, circuitry related to branch prediction may still operate even through the branch prediction mode is disabled, thereby allowing the continued gathering of data regarding numbers of branches and the number of mispredictions over a predetermined period. Using data from the branch circuitry and counters 315, branch control circuitry 316 may re-enable branch prediction dependent upon the calculated rates of branches and branch mispredictions.

In one embodiment, IFU 310 may be configured to maintain a pool of fetched, ready-for-issue instructions drawn from among each of the threads being executed by core 300. For example, IFU 310 may implement a respective instruction buffer corresponding to each thread in which several recently-fetched instructions from the corresponding thread may be stored. In some embodiments, IFU 310 may be configured to select multiple ready-to-issue instructions and concurrently issue the selected instructions to various functional units without constraining the threads from which the issued instructions are selected. In other embodiments, thread-based constraints may be employed to simplify the selection of instructions. For example, threads may be assigned to thread groups for which instruction selection is performed independently (e.g., by selecting a certain number of instructions per thread group without regard to other thread groups).

In some embodiments, IFU 310 may be configured to further prepare instructions for execution, for example by decoding instructions, detecting scheduling hazards, arbitrating for access to contended resources, or the like. Moreover, in some embodiments, instructions from a given thread may be speculatively issued from IFU 310 for execution. For example, a given instruction from a certain thread may fall in the shadow of a conditional branch instruction from that same thread that was predicted to be taken or not-taken, or a load instruction from that same thread that was predicted to hit in data cache 352, but for which the actual outcome has not yet been determined. In such embodiments, after receiving notice of a misspeculation such as a branch misprediction or a load miss, IFU 310 may be configured to cancel misspeculated instructions from a given thread as well as issued instructions from the given thread that are dependent on or subsequent to the misspeculated instruction, and to redirect instruction fetch appropriately.

Execution unit 330 may be configured to execute and provide results for certain types of instructions issued from IFU 310. In one embodiment, execution unit 330 may be configured to execute certain integer-type instructions defined in the implemented ISA, such as arithmetic, logical, and shift instructions. It is contemplated that in some embodiments, core 300 may include more than one execution unit 330, and each of the execution units may or may not be symmetric in functionality. Finally, in the illustrated embodiment instructions destined for FGU 340 or LSU 350 pass through execution unit 330. However, in alternative embodiments it is contemplated that such instructions may be issued directly from IFU 310 to their respective units without passing through execution unit 330.

Floating point/graphics unit 340 may be configured to execute and provide results for certain floating-point and graphics-oriented instructions defined in the implemented ISA. For example, in one embodiment FGU 340 may implement single- and double-precision floating-point arithmetic instructions compliant with a version of the Institute of Electrical and Electronics Engineers (IEEE) 754 Standard for Binary Floating-Point Arithmetic (more simply referred to as the IEEE 754 standard), such as add, subtract, multiply, divide, and certain transcendental functions. Also, in one embodiment FGU 340 may implement partitioned-arithmetic and graphics-oriented instructions defined by a version of the SPARC® Visual Instruction Set (VIS™) architecture, such as VIS™ 2.0. Additionally, in one embodiment FGU 340 may implement certain integer instructions such as integer multiply, divide, and population count instructions, and may be configured to perform multiplication operations on behalf of stream processing unit 240. Depending on the implementation of FGU 360, some instructions (e.g., some transcendental or extended-precision instructions) or instruction operand or result scenarios (e.g., certain abnormal operands or expected results) may be trapped and handled or emulated by software.

In the illustrated embodiment, FGU 340 may be configured to store floating-point register state information for each thread in a floating-point register file. In one embodiment, FGU 340 may implement separate execution pipelines for floating point add/multiply, divide/square root, and graphics operations, while in other embodiments the instructions implemented by FGU 340 may be differently partitioned. In various embodiments, instructions implemented by FGU 340 may be fully pipelined (i.e., FGU 340 may be capable of starting one new instruction per execution cycle), partially pipelined, or may block issue until complete, depending on the instruction type. For example, in one embodiment floating-point add operations may be fully pipelined, while floating-point divide operations may block other divide/square root operations until completed.

Load store unit 350 may be configured to process data memory references, such as integer and floating-point load and store instructions as well as memory requests that may originate from stream processing unit 360. In some embodiments, LSU 350 may also be configured to assist in the processing of instruction cache 314 misses originating from IFU 310. LSU 350 may include a data cache 352 as well as logic configured to detect cache misses and to responsively request data from L3 cache 230 via cache interface 370. In one embodiment, data cache 352 may be configured as a write-through cache in which all stores are written to L3 cache 230 regardless of whether they hit in data cache 352; in some such embodiments, stores that miss in data cache 352 may cause an entry corresponding to the store data to be allocated within the cache. In other embodiments, data cache 352 may be implemented as a write-back cache.

In one embodiment, LSU 350 may include a miss queue configured to store records of pending memory accesses that have missed in data cache 352 such that additional memory accesses targeting memory addresses for which a miss is pending may not generate additional L3 cache request traffic. In the illustrated embodiment, address generation for a load/store instruction may be performed by one of EXUs 330. Depending on the addressing mode specified by the instruction, one of EXUs 330 may perform arithmetic (such as adding an index value to a base value, for example) to yield the desired address. Additionally, in some embodiments LSU 350 may include logic configured to translate virtual data addresses generated by EXUs 330 to physical addresses, such as a Data Translation Lookaside Buffer (DTLB).

Crypto processing unit 360 may be configured to implement one or more specific data processing algorithms in hardware. For example, crypto processing unit 360 may include logic configured to support encryption/decryption algorithms such as Advanced Encryption Standard (AES), Data Encryption Standard/Triple Data Encryption Standard (DES/3DES), or Ron's Code #4 (RC4). Crypto processing unit 240 may also include logic to implement hash or checksum algorithms such as Secure Hash Algorithm (SHA-1, SHA-256), Message Digest 5 (MD5), or Cyclic Redundancy Checksum (CRC). Crypto processing unit 360 may also be configured to implement modular arithmetic such as modular multiplication, reduction and exponentiation. In one embodiment, crypto processing unit 360 may be configured to utilize the multiply array included in FGU 340 for modular multiplication. In various embodiments, crypto processing unit 360 may implement several of the aforementioned algorithms as well as other algorithms not specifically described.

Crypto processing unit 360 may be configured to execute as a coprocessor independent of integer or floating-point instruction issue or execution. For example, in one embodiment crypto processing unit 360 may be configured to receive operations and operands via control registers accessible via software; in the illustrated embodiment crypto processing unit 360 may access such control registers via LSU 350. In such embodiments, crypto processing unit 360 may be indirectly programmed or configured by instructions issued from IFU 310, such as instructions to read or write control registers. However, even if indirectly programmed by such instructions, crypto processing unit 360 may execute independently without further interlock or coordination with IFU 310. In another embodiment crypto processing unit 360 may receive operations (e.g., instructions) and operands decoded and issued from the instruction stream by IFU 310, and may execute in response to such operations. That is, in such an embodiment crypto processing unit 360 may be configured as an additional functional unit schedulable from the instruction stream, rather than as an independent coprocessor.

In some embodiments, crypto processing unit 360 may be configured to freely schedule operations across its various algorithmic subunits independent of other functional unit activity. Additionally, crypto processing unit 360 may be configured to generate memory load and store activity, for example to system memory. In the illustrated embodiment, crypto processing unit 360 may interact directly with cache interface 370 for such memory activity, while in other embodiments crypto processing unit 360 may coordinate memory activity through LSU 350. In one embodiment, software may poll crypto processing unit 360 through one or more control registers to determine result status and to retrieve ready results, for example by accessing additional control registers. In other embodiments, FGU 340, LSU 350 or other logic may be configured to poll crypto processing unit 360 at intervals to determine whether it has results that are ready to write back. In still other embodiments, crypto processing unit 360 may be configured to generate a trap when a result is ready, to allow software to coordinate result retrieval and processing.

L2 cache memory 390 may be configured to cache instructions and data for use by execution unit 330. In the illustrated embodiment, L2 cache memory 390 may be organized into multiple separately addressable banks that may each be independently accessed. In some embodiments, each individual bank may be implemented using set-associative or direct-mapped techniques. L2 cache memory 390 may, in various embodiments, be partitioned into a data cache and an instruction cache. In such cases, a miss to the L1 instruction cache may be serviced by the L2 instruction cache, and a miss to the L1 data cache may be serviced by the L2 data cache.

L2 cache memory 390 may be implemented in some embodiments as a writeback cache in which written (dirty) data may not be written to system memory until a corresponding cache line is evicted. L2 cache memory 390 may variously be implemented as single-ported or multiported (i.e., capable of processing multiple concurrent read and/or write accesses). In either case, L2 cache memory 390 may implement arbitration logic to prioritize cache access among various cache read and write requestors.

In some embodiments, L2 cache memory 390 may be configured to operate in a diagnostic mode that allows direct access to the cache memory. For example, in such a mode, L2 cache memory 390 may permit the explicit addressing of specific cache structures such as individual sets, banks, ways, etc., in contrast to a conventional mode of cache operation in which some aspects of the cache may not be directly selectable (such as, e.g., individual cache ways). The diagnostic mode may be implemented as a direct port to L2 cache memory 390.

L2 cache memory 390 may be further configured to implement a BIST. An address generator, a test pattern generator, and a BIST controller may be included in L2 cache memory 390. The address generator, test pattern generator, and BIST controller may be implemented in hardware, software, or a combination thereof. The BIST may perform tests such as, e.g., checkerboard, walking 1/0, sliding diagonal, and the like, to determine that data storage cells within L2 cache memory 390 are capable of storing both a logical 0 and logical 1. In the case where the BIST determines that not all data storage cells within L2 cache memory 390 are functional, a flag or other signal may be activated indicating that L2 cache memory 390 is faulty.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 314 or data cache 352. In the event no translation for a given virtual page number is found in the appropriate TLB, memory management unit 320 may be configured to provide a translation. In one embodiment, MMU 250 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk.) In some embodiments, if MMU 320 is unable to derive a valid address translation, for example if one of the memory pages including a necessary page table is not resident in physical memory (i.e., a page miss), MMU 320 may be configured to generate a trap to allow a memory management software routine to handle the translation. It is contemplated that in various embodiments, any desirable page size may be employed. Further, in some embodiments multiple page sizes may be concurrently supported.

A number of functional units in the illustrated embodiment of core 300 may be configured to generate off-core memory or I/O requests. For example, IFU 310 or LSU 350 may generate access requests to L3 cache 230 in response to their respective cache misses. Crypto processing unit 360 may be configured to generate its own load and store requests independent of LSU 350, and MMU 320 may be configured to generate memory requests while executing a page table walk. Other types of off-core access requests are possible and contemplated. In the illustrated embodiment, cache interface 370 may be configured to provide a centralized interface to the port of a corresponding cache memory partition, such as, cache memory pardons 202*a*, for example. In one embodiment, cache interface 370 may be configured to maintain queues of pending cache requests and to arbitrate among pending requests to determine which request or requests may be conveyed to the cache memory partition during a given execution cycle.

During the course of operation of some embodiments of core 300, exceptional events may occur. For example, an instruction from a given thread that is picked for execution by pick unit 316 may be not be a valid instruction for the ISA implemented by core 300 (e.g., the instruction may have an illegal opcode), a floating-point instruction may produce a result that requires further processing in software, MMU 320 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 380 may be configured to manage the handling of such events. For example, TLU 380 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 380 may be configured to flush all instructions from the trapping thread from any stage of processing within core 300, without disrupting the execution of other, non-trapping threads. In some embodiments, when a specific instruction from a given thread causes a trap (as opposed to a trap-causing condition independent of instruction execution, such as a hardware interrupt request), TLU 380 may implement such traps as precise traps. That is, TLU 380 may ensure that all instructions from the given thread that occur before the trapping instruction (in program order) complete and update architectural state, while no instructions from the given thread that occur after the trapping instruction (in program order) complete or update architectural state.

Cache Memory Partitions and Speculative Memory Reads

Figure 4:
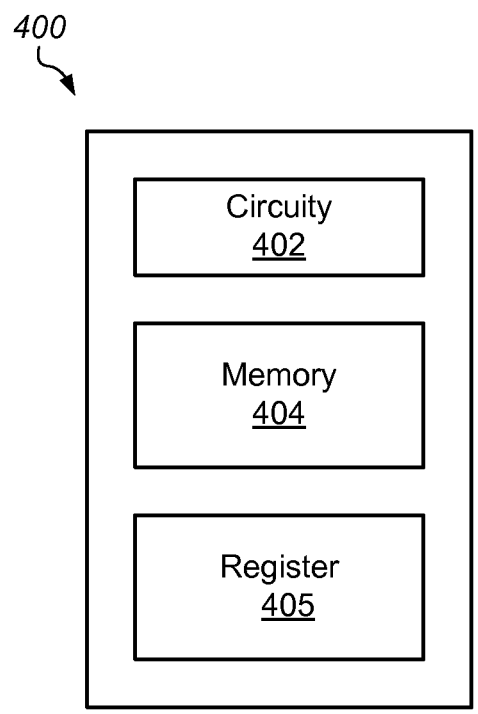
FIG. 4 is a block diagram of an embodiment cache memory partition.

Turning to FIG. 4, an embodiment of a partition of a cache memory is illustrated. In the illustrated embodiment, cache memory partition 400 includes circuitry 402, memory 404, and register 405. In some embodiments, cache memory partition 400 may correspond to any of cache partitions 202*a-h* as illustrated in FIG. 2.

Memory 404 may, in various embodiments, include multiple data storage cells, such as, dynamic storage cells, static storage cells, non-volatile storage cells, or any suitable data storage cell. In some embodiments, memory 404 may include dual-port data storage cells allowing read and write operations to be performed in parallel. It is noted that although only a single memory is depicted in cache memory partition 400, in other embodiments, any suitable number of memories may be employed.

As described below in more detail in regard to FIG. 5, register 405 may include multiple bit locations. Each bit location may include a data storage circuit configured to store a logic state, either a logic 1 value or a logic 0 value. In some embodiments, each register may correspond to a respective partition, and may track a source of return data (either another partition or another memory) for requests made to the respective partition. Additional registers may be used, in other embodiments, to track sources of return data on a per execution thread basis for each partition. It is noted that although two possible sources of return data are described above, in other embodiments, data from multiple bit locations within register 405 may be used to allow for the tracking of additional data sources. Although a single register is depicted in the embodiment of FIG. 4, in other embodiments, any suitable number of registers may be employed.

Circuitry 402 may include a combination of logic gates configured to perform specific tasks, such as, e.g., receive a request for data from a processor core, such as, core 201a of FIG. 2, for example. In some embodiments, circuitry 402 may include one or more state elements, such as, e.g., flip-flops or latches, which may be included in a sequential logic circuit (commonly referred to as a "state machine") configured to perform various tasks relating to the operation of cache memory 403. Circuitry 402 may, in other embodiments, include a general-purpose processor configured to execute program instructions. While circuitry 402 is shown, in the illustrated embodiment, as being included in cache memory partition 400, in some embodiments, the circuitry may be located in another functional unit or may be shared with another cache memory partition.

During operation, circuitry 402 may receive a request for data from a processor or processor core directed to memory 404. Upon determining that the request data is not currently stored in memory 404, circuitry 402 may read contents of register 405. Circuitry 402 may use the contents of the read register to determine if a speculative read should be initiated. For example, circuitry 402 may determine if a number of logic 1 values stored in the read register is less than or equal to a predetermined threshold value. In other embodiments, circuitry 402 may use any suitable combination of data bits stored in register 405 in determining if a speculative read should be initiated. In response to determining that a speculative read should be initiated, circuitry 402 may send a request to system memory via a communication network. For example, as depicted in FIG. 2, a request may be sent via on-chip network 205, to memory control unit 204. The memory management unit may then schedule the read along with other requests for data from system memory.

In the event of a miss for a memory 404, circuitry 402 generates a request for the data from another cache memory partition. In some embodiments, circuitry 402 may send the request via a communication network, such as, on-chip network 205 as illustrated in FIG. 2, for example. Such a request may, in some embodiments, be processed by a coherence engine, such as, e.g., coherence engine 203a as depicted in FIG. 2. The coherence engine may determine if the requested data is available in another cache memory partition, and, if so, send a request to a cache memory partition storing the requested data, to send the requested data to the requesting entity. In other embodiments, the request sent by circuitry 402 may travel to each cache memory partition, and each cache memory partition may send an appropriate response upon determining if the requested data is available. Upon receiving the requested data from another cache memory partition, circuitry 402 may update one or more values in register 405. The updated value may, in various embodiments, include information indicative of which cache memory partition contained the requested data.

It is noted that the embodiment illustrated in FIG. 4 is merely an example. In other embodiments, different numbers of partitions, and different numbers of registers, are possible and contemplated.

Figure 5:
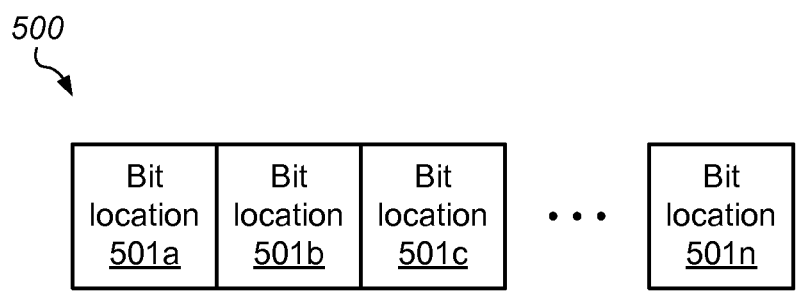
FIG. 5 illustrates a block diagram of a history register.

Turning to FIG. 5, a block diagram of an embodiment of a history register is depicted. History register 500 may, in various embodiments, correspond to register 405 as illustrated in FIG. 4. In the illustrated embodiment, history register 500 includes multiple bit locations 501a through 501n. Each bit location may be configured to store a single data bit. In various embodiments, any suitable number of bit locations may be employed, such as, e.g., eight bit locations.

Each bit location may include a storage circuit such as, e.g., a latch or flip-flop. In other embodiments, a data storage cell, such as, a Static Random Access Memory (SRAM) data storage cell, may be employed. Such storage circuits may include multiple data ports and may, in some embodiments, have a dedicated port for reading the data bit stored in the cell, and a dedicated port for writing new data into the storage circuit. Reading data from, and writing data to the data storage cell may be performed in a synchronous fashion relative to a clock signal, or may be performed asynchronously to a timing reference. In some embodiments, the data storage cell of included in each bit location may be configured to be reset to a predetermined logic level, such as, a logic 0 value, for example.

The data stored each the storage cell of each bit location may be indicative of a location from which previously returned data returned. For example, in some embodiments, if the a previous cache miss resulted in data being returned from another partition within the cache memory, such as, e.g., cache partition 202d of FIG. 2, then a logic 1 value may be written into the corresponding data storage cell. Alternatively, if the previous cache miss resulted in data being returned from a higher level cache memory or system memory, then a logic 0 value may be written into the corresponding data storage cell.

It is noted that "low" of "logic 0 value" refers to a voltage at or near ground and that "high" or "logic 1 value" references to a voltage sufficiently large to turn on a n-channel Metal Oxide Semiconductor Field Effect Transistor (MOSFET) and turn off a p-channel MOSFET. In other embodiments, different technology my result in different voltage levels for "low" and "high."

It is noted that the embodiment illustrated in FIG. 5 is merely an example. In other embodiments, different numbers of bit locations may be employed.

Figure 6:
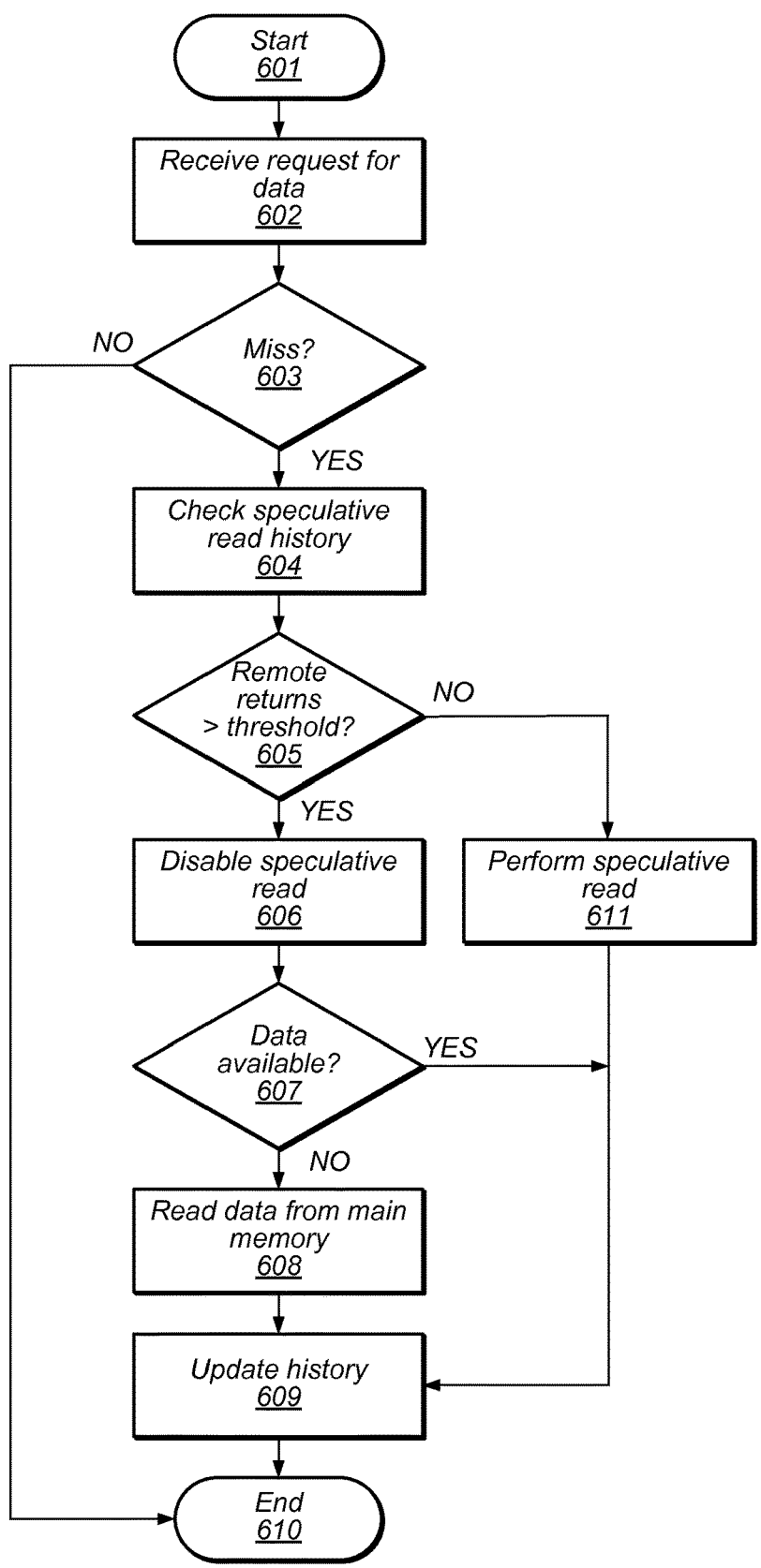
FIG. 6 illustrates a flow diagram depicting an embodiment of method for operating a cache memory.

Turning to FIG. 6, a flow diagram depicting an embodiment of a method for operating a cache memory is illustrated. Referring collectively to FIG. 2, and the flow diagram of FIG. 6, the method begins in block 601. A request for data may then be received by a given one of cache memory partitions 202a-h (block 602). The request may originate from a corresponding a given processor core within a given one of core groups 201a-h, and may include a request for a program instruction or data. The method may then depend on if the requested data is stored within the particular partition of the cache (block 603).

If the requested data is stored within the given one of cache memory partitions 202a-h, then the requested data is sent to the corresponding processor core, and the method may then conclude in block 610. If, however, the requested data is not present within the given cache memory partition, then a history of speculative reads performed may then be checked (block 604).

In some embodiments, a register, such as, e.g., register 405 as illustrated in FIG. 4, may be read. The data retrieved from the register may be analyzed to determine a number of times that data was returned from one of the other cache memory partitions 202a-h. For example, in the case where individual bit locations within the register were updated with a logic 1 value to denote that data was returned from a related partition, then additional circuitry may determine a total number of logic 1 values present in the contents of the register. It is noted that in some embodiments, additional registers may be employed to track similar information on a execution thread basis.

The method may then depend on a number of times data was returned from a related partition (block 605). When the number of the number of times data was returned from a related partition is less than or equal to a predetermined threshold value, a speculative read may be performed (block 611). The speculative read may pass through coherence engines 203a-b and then sent to system memory via memory control unit 204. In some embodiments, the speculative read may be sent to memory control unit 204 via a communication network, such as, e.g., on-chip network 205, for example. Although in the above description, the speculative read is performed from system memory, in other embodiments, such a read may be performed from a higher level cache memory.

Once results of the speculative read has been received, the speculative read history may then be updated (block 609). As described below in more detail in regard to FIG. 7, a value may be written into a given bit location within a register indicating the location where the requested data was found, i.e., a related partition or another memory. In some embodiments, when a last entry in the register has been reached, the value may be written into an initial entry in the register. The register may, in various embodiments, be reset after a predetermined number of read requests have been received. With the update of the history complete, the method may then conclude in block 610.

When the number of times data was returned from a related partition is greater than the predetermined threshold value, execution of a speculative read may be disabled (block 606). In some embodiments, the number of times data was returned from a related partition may indicate that it is likely that the requested data may be found in a related partition. A read from memory may, in various embodiments, be subsequently scheduled if it is determined that the requested data is not stored in any partition of the cache memory. By disabling the execution of speculative read, power may be saved in the event that the requested data was found in a related partition, and only performing memory reads in cases where the requested data is not stored in the cache memory.

Once the speculative read has been disabled, the method may depend on if the requested data was available in another cache memory partition (block 607). If the requested data was found in another cache memory partition, then the history may be updated to indicate that the requested data was found in another cache memory partition (block 609). The method may then conclude in block 610.

If, however, the requested data was not found in any of the available cache memory partitions, the data will need to be read from main or system memory (block 608). Since a speculative read was not performed, when such a situation occurs, additional latency may result, in various embodiments, as a read request is sent to a memory management unit, such as, e.g., memory control unit 204 of FIG. 2, and the memory management unit schedules the read request with other requests being made to the main or system memory. Once the requested data has been read from the main or system memory, the method may conclude in block 610.

It is noted that the method illustrated in FIG. 6 is merely an example. In other embodiments, different operations, and different orders of operation are possible and contemplated.

Figure 7:
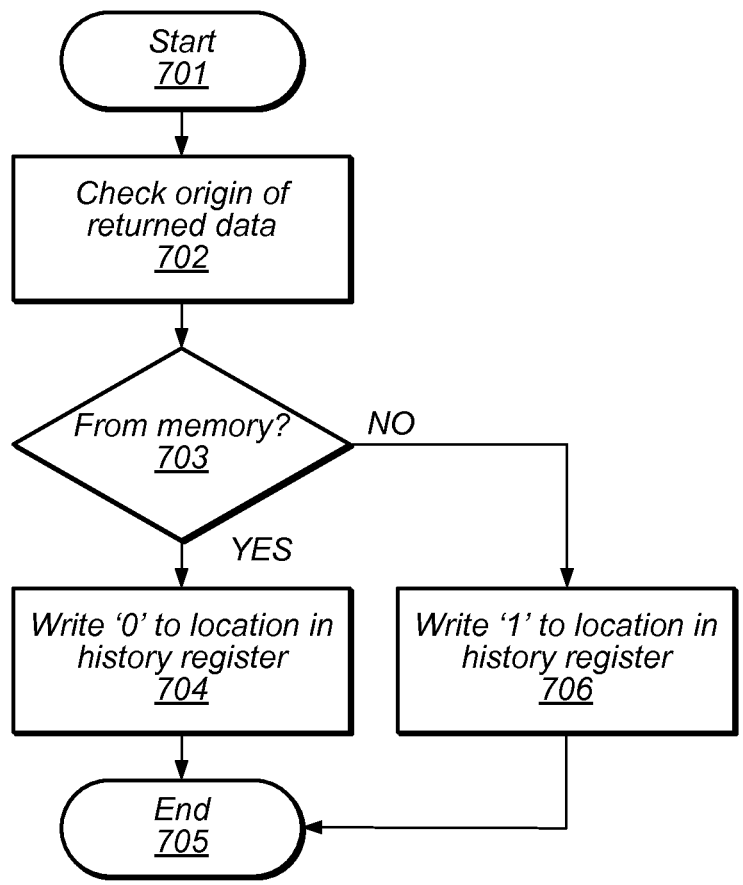
FIG. 7 illustrates a flow diagram depicting an embodiment of a method for updating a history register.

Turning to FIG. 7, an embodiment of a method for updating a history register is depicted in the illustrated flowchart. In some embodiments, the method depicted in the flow diagram of FIG. 7 may correspond to block 607 of the method illustrated in FIG. 6. Referring collectively to FIG. 4, FIG. 5, and the flow diagram of FIG. 7, the method begins in block 701.

The origin of the data returned from a request may then be determined (block 702). In some embodiments, the data may have been returned from another partition within a cache memory, such as cache memory 400 as illustrated in FIG. 4, for example. If the requested data is not present within another partition of the cache memory, the requested data may be returned from another memory, such as, e.g., system memory. It is noted, however, that the data may be returned from a higher-level cache memory in some embodiments.

The method may then depend on the origin of the returned data (block 703). If the returned data was the result of a speculative, or otherwise scheduled, read to memory, or alternatively a higher-level cache memory, then a logic 0 value may be written to the history register (block 704). In some embodiments, each bit location within the register may correspond to a given request for data, and the logic 0 value may be written into a data storage cell in a bit location corresponding to the current request. The register may include sufficient bit locations to track any suitable number of data requests. Each bit location may be filled in a sequential fashion, and when all bit locations have been used, an initial bit location may be re-used in a "wrap around" fashion. With the update to register complete, the method may conclude in block 705.

If the returned data was from another partition within the cache memory, such as, e.g., partition 404b, then a logic 1 value may be written to the history register (block 706). As with the case of writing a logic 0 value, the logic 1 value may be written into a data storage cell in a bit location corresponding to the current request. With the writing of the logic 1 value to the register, the method may then conclude in block 705.

The operations of the method illustrated in the flowchart of FIG. 7 are depicted as being performed in a sequential fashion. In other embodiments, one or more of the operations may be performed in parallel.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
a first memory including a plurality of partitions;

at least one register including a plurality of bit locations, wherein a particular bit location of the plurality of bit locations corresponds to a particular memory location, and wherein the particular bit location is configured to store information indicative of whether previously requested data was retrieved from a given memory location corresponding to the particular bit location for at least one previous read request; and circuitry configured to:
receive a read request for data from a first partition of the plurality of partitions;
read one or more values from the at least one register in response to a determination that the data is not stored in the first partition of the plurality of partitions; and
initiate a speculative read of the data from a second memory based on the one or more values;
update a value stored in a given bit location of the plurality of bit locations corresponding to the first partition of the plurality of partitions, in response to the determination that the data is not stored in the first partition of the plurality of partitions; and
update a value in another bit location of the plurality of bit locations corresponding to a memory location from which the data for the read request was returned.

2. The apparatus of claim 1, wherein to initiate the speculative read of the data the circuitry is further configured to determine a number of previous read requests whose source of returned data is a given partition of the plurality of partitions.

3. The apparatus of claim 2, wherein the circuitry is further configured to initiate the speculative read in response to a determination that the number of previous read requests whose source of returned data is a given partition of the plurality of partitions is less than a predetermined threshold value.

4. The apparatus of claim 1, wherein a given bit location of the plurality of bit locations corresponds a particular execution thread of a plurality of execution threads.

5. A method for operating a memory, the method comprising:
receiving a read request for data from a first partition of a plurality of partitions of a first memory;
reading one or more values from at least one register in response to determining that the data is not stored in the first partition of the plurality of partitions, wherein the at least one register includes a plurality of bit locations, wherein a particular bit location of the plurality of bit locations corresponds to a particular memory location;
initiating a speculative read of the data from a second memory based on the one or more values;
updating a value stored in a given bit location of the plurality of bit locations corresponding to the first partition of the plurality of partitions, in response to determining that the data is not stored in the first partition of the plurality of partitions; and
updating a value in another bit location of the plurality of bit locations corresponding to a memory location from which the data for the read request was returned.

6. The method of claim 5, wherein initiating the speculative read comprises determining a number of previous read requests whose source of returned data is a given partition of the plurality of partitions.

7. The method of claim 6, further comprising initiating the speculative read in response to determining the number of previous read requests whose source of returned data is a given partition of the plurality of partitions is less than a predetermined threshold value.

8. The method of claim 5, wherein a particular bit location of the plurality of bit locations corresponds to a particular execution thread of a plurality of execution threads.

9. The method of claim 5, wherein the second memory comprises system memory.

10. A system, comprising:
a first memory including a plurality of partitions;
at least one register including a plurality of bit locations, wherein a particular bit location of the plurality of bit locations corresponds to a particular memory location, and wherein the particular bit location is configured to store information indicative of whether previously requested data was retrieved from a given memory location corresponding to the particular bit location for at least one previous read request;
a second memory; and
a plurality of processors, wherein a given processor of the plurality of processors is configured to send a read request to the first memory for data from a first partition of the plurality of partitions;
wherein the first memory is configured to:
receive the read request;
read one or more values from the at least one register in response to a determination that the data is not stored in the first partition of the plurality of partitions;
initiate a speculative read of the data from the second memory based on the one or more values;
update a value stored in a given bit location of the plurality of bit locations, in response to a determination that the data is not stored in the first partition of the plurality of partitions; and
update a value in another bit location of the plurality of bit locations corresponding to a memory location from which the data for the read request was returned.

11. The system of claim 10, wherein to initiate the speculative read of the data from the second memory, the first memory is further configured to determine a number of previous read requests whose source of returned data is a given partition of the plurality of partitions.

12. The system of claim 11, wherein the first memory is further configured to initiate the speculative read in response to a determination that the number of previous read requests whose source of returned data is a given memory partition of the plurality of partitions is less than a predetermined threshold value.

13. The system of claim 10, wherein a given bit location of the plurality of bit locations corresponds to a particular execution thread of a plurality of execution threads.

* * * * *

UNITED STATES PATENT AND TRADEMARK OFFICE
CERTIFICATE OF CORRECTION

PATENT NO. : 10,120,800 B2
APPLICATION NO. : 14/584755
DATED : November 6, 2018
INVENTOR(S) : Sivaramakrishnan et al.

It is certified that error appears in the above-identified patent and that said Letters Patent is hereby corrected as shown below:

In the Specification

In Column 4, Line 47, delete "a-h." and insert -- a-h, --, therefor.

In Column 4, Line 60, delete "205." and insert -- 205 --, therefor.

In Column 5, Line 24, delete "a-h." and insert -- a-h --, therefor.

In Column 6, Line 59, delete "(Firewire)" and insert -- (Firewire®) --, therefor.

In Column 14, Line 20, after "the" delete "a".

Signed and Sealed this
Twenty-ninth Day of October, 2019

Andrei Iancu
*Director of the United States Patent and Trademark Office*